United States Patent
Wright et al.

(10) Patent No.: US 9,485,103 B2
(45) Date of Patent: Nov. 1, 2016

(54) BRIDGE CIRCUIT FOR ETHERNET POWERED DEVICE

(71) Applicant: Hewlett-Packard Development Company, L.P., Houston, TX (US)

(72) Inventors: Robert S Wright, Spring, TX (US); Robert C Brooks, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 684 days.

(21) Appl. No.: 13/712,856

(22) Filed: Dec. 12, 2012

(65) Prior Publication Data

US 2014/0164795 A1    Jun. 12, 2014

(51) Int. Cl.
*H04L 12/10* (2006.01)
*G06F 1/26* (2006.01)

(52) U.S. Cl.
CPC *H04L 12/10* (2013.01); *G06F 1/26* (2013.01)

(58) Field of Classification Search
CPC .................................. G06F 1/26; H04L 12/10
See application file for complete search history.

(56) References Cited

U.S. PATENT DOCUMENTS

| | | | |
|---|---|---|---|
| 4,292,473 A * | 9/1981 | Venken et al. | 379/382 |
| 6,108,219 A | 8/2000 | French | |
| 6,897,707 B2 | 5/2005 | Beck | |
| 8,013,466 B1 | 9/2011 | Thompson et al. | |
| 2006/0238252 A1* | 10/2006 | Crawley et al. | 330/253 |
| 2011/0125341 A1 | 5/2011 | Heath et al. | |

OTHER PUBLICATIONS

Mike Tooley, Electronic Circuits: Fundamentals & Applications, Newnes, 2002, Second edition, pp. 84-85.*
Texas Instruments Inc., "FET Bridge," Oct. 11, 2011, 1 p.
Sha Zhanyou, "The Circuit Design of Power Converter Based on Ethernet Interface," Apr. 2006, 2 p.

* cited by examiner

*Primary Examiner* — Zahid Choudhury
*Assistant Examiner* — Siamak S Hefazi
(74) *Attorney, Agent, or Firm* — HP Inc. Patent Department

(57) ABSTRACT

A network powered device includes field effect transistors connected as bridge circuit. The bridge circuit includes control circuitry to enable the FETs based on completion of a powered device detection sequence performed by power sourcing equipment coupled to the device via an Ethernet link.

18 Claims, 3 Drawing Sheets

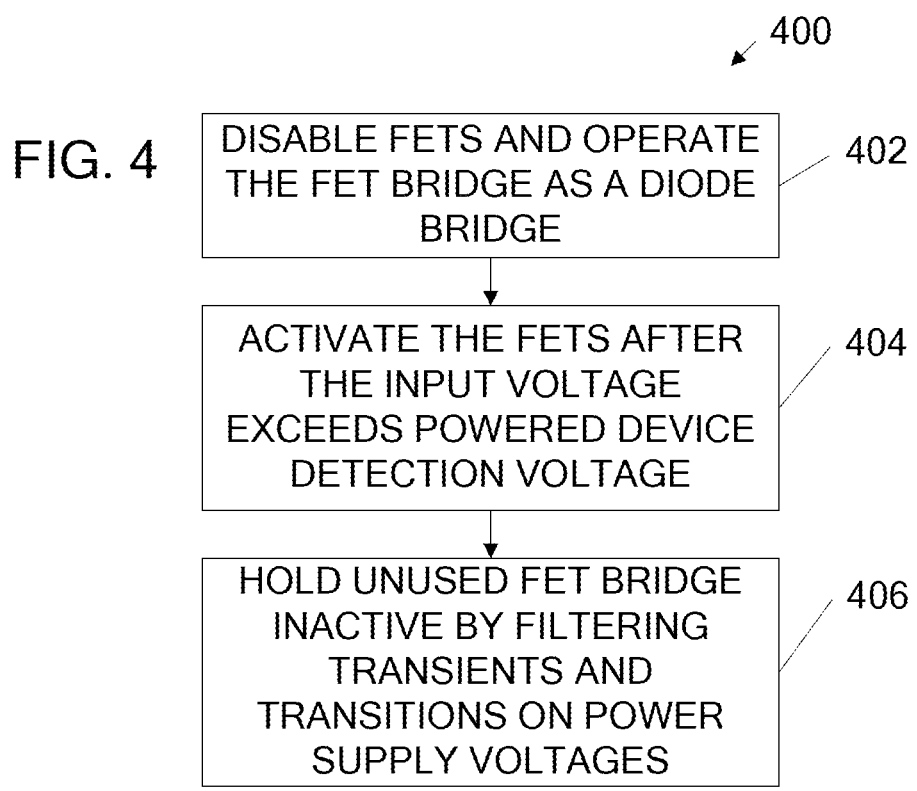

BRIDGE CIRCUIT FOR ETHERNET POWERED DEVICE

BACKGROUND

It is often convenient to position networked devices in locations that lack access to an AC power outlet. To facilitate such positioning, power over Ethernet (PoE) standards have been developed. PoE allows a power sourcing device, such as an Ethernet switch, to provide power to a network device via the data communication cabling (e.g., category 3 cabling, category 5 cabling, etc.) that connects the network device and the power sourcing device. IEEE 802.3af and IEEE 802.3at are examples of PoE standards.

BRIEF DESCRIPTION OF THE DRAWINGS

For a detailed description of examples of the invention, reference will now be made to the accompanying drawings in which:

FIG. 4 shows a flow diagram for a method for using a field effect transistor bridge in a network device powered via PoE in accordance with principles disclosed herein.

NOTATION AND NOMENCLATURE

Figure 1:
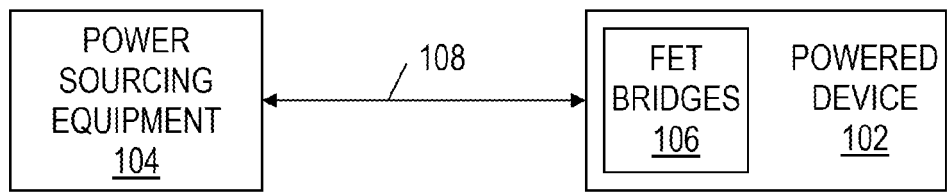
FIG. 1 shows a block diagram of a system employing power over Ethernet (PoE) in accordance with principles disclosed herein.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or a direct connection. Thus, if a first component couples to a second component, the connection may be through a direct connection or through an indirect connection via other components and connections. The recitation "based on" is intended to mean "based at least in part on." Therefore, if X is based on Y, X may be based on Y and any number of other factors.

DETAILED DESCRIPTION

The following discussion is directed to various implementations of a FET bridge circuit used in a network device powered via Ethernet. Although one or more of these implementations may be preferred, the implementations disclosed should not be interpreted, or otherwise used, as limiting the scope of the disclosure, including the claims. In addition, one skilled in the art will understand that the following description has broad application, and the discussion of any implementation is illustrative and is not intended to intimate that the scope of the disclosure, including the claims, is limited to that implementation.

Power over Ethernet (PoE) can provide DC power to network-powered devices over one of multiple sets of power conductors (e.g., two sets of four wires each) where each set of power conductors includes multiple power conductors and multiple return conductors (e.g., a pair of positive wires and a pair of negative wires). While the polarity of the power conductors is defined by the PoE standards, network-powered devices should accommodate inadvertent reversals in power conductor polarity. That is, the network-powered device must operate properly regardless of the polarity of power received via the Ethernet cabling. The power input of a network powered device may include a bridge circuit to provide polarity insensitivity.

A bridge circuit for accommodating power polarity reversal typically comprises four diodes arranged as a diode bridge. The diodes provide the requisite polarity insensitivity, but the voltage drop across the diodes reduces power utilization efficiency of the network-powered device. To improve power utilization efficiency, a field effect transistor (FET) bridge may be employed rather than a diode bridge. Due to the low resistance provided by the FET bridge, the voltage drop across the FET bridge may be substantially lower than that of a diode bridge.

While advantageously providing higher efficiency, application of FET bridges in PoE powered devices presents numerous issues and difficulties. Power FETs are significantly more expensive than diodes, and a network-powered device includes two bridges to rectify the two sets of power conductors used by PoE, thereby further increasing the cost associated with using FET rather than diode bridges.

Use of FET bridges in a PoE powered device present additional problems with regard to implementation in compliance with the requirements of the PoE standards (e.g., IEEE 802at-2009). The PoE standards do not appear to contemplate the use of FET bridges, and conventional FET bridge implementations can produce violations of the PoE standards that cause a powered device to fail PoE certification testing and/or fail to operate at all. The PoE powered device disclosed herein include bridges that allow the PoE powered device to operate in compliance with PoE standards while providing the power efficiency characteristic of FET bridges.

FIG. 1 shows a block diagram of a system 100 employing power over Ethernet (PoE) in accordance with principles disclosed herein. The system 100 includes a powered device 102 and power sourcing equipment (PSE) 104 coupled via an Ethernet link 108. The PSE 104 may be a network switch, a hub, or any other equipment that provides power to the powered device 102 via the Ethernet link 108. The powered device 102 may be any device that receives power to operate via the Ethernet link 108. For example, the powered device 102 may be an internet protocol telephone, a camera, a computing device, a wireless access point, etc. The Ethernet link 108 includes conductors for electrically transferring power, and optionally data, between the PSE 104 and the powered device 102. The Ethernet link 108 may include category (Cat) 3 cable, Cat 5 cable, etc.

In order to determine whether a device to which the PSE 104 is connected is to be powered via the Ethernet link 108, the PSE 104 executes a powered device detection sequence. During the detection sequence, the PSE 104 measures the resistance presented by the device 102 connected to the PSE 104 via the Ethernet link 108. To measure the resistance, the PSE drives at least two different voltages onto the Ethernet link and measures the current flowing through the device 102 responsive to the voltages. If the measured resistance is within a predetermined range, the PSE 104 determines that a powered device 102 is connected to the Ethernet link 108 and proceeds to determine the power requirements of and provide operating power to the powered device 102.

The powered device 102 includes FET bridges 106 at the power input terminals connecting the powered device 102 to the Ethernet link 108. The FET bridges 106 reduce the voltage drop of the connection to the Ethernet link 108, relative to diode bridges, thereby improving the power efficiency of the powered device 102. Unfortunately, operation of conventional FET bridges can interfere with the powered device detection sequence by changing the resistance of the current path through the powered device when the FETs are activated. Such changes in resistance may cause the resistance measured by the PSE 104 to fall outside of the resistance range that identifies a powered device. Consequently, operation of the FET bridges may cause the PSE 104 to misidentify a powered device (i.e., a device to be powered via the Ethernet link 108) as a non-powered device. The FET bridges 106 include control circuitry that prevents misidentification of the powered device 102 due to changes in resistance and prevents reverse voltage propagation through an unused FET bridge.

Figure 2:
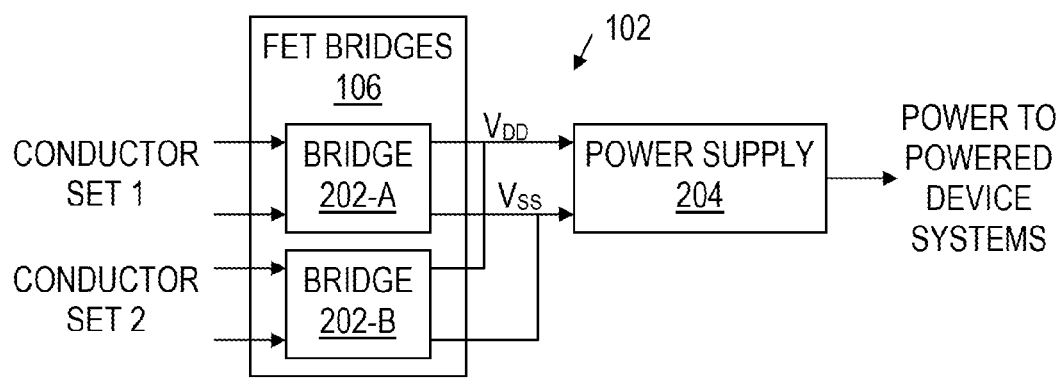
FIG. 2 shows a block diagram of a network device powered via PoE in accordance with principles disclosed herein.

FIG. 2 shows a block diagram of the network powered device 102 powered via PoE in accordance with principles disclosed herein. The PSE 104 may provide power to the powered device 102 via any one of multiple sets of power conductors of the Ethernet link 108. The FET bridges 106 includes multiple instances of the FET bridge 202 (202-A/B) with one FET bridge 202 coupled to each set of power conductors. The outputs of each FET bridge 202 are connected in parallel to provide power to the power supply 204 that generates the various voltage levels that power the powered device 102.

The bridges 202 are not isolated from one another using diodes because isolation diode voltage drops would negate the efficiency gains of the FET bridges 202. Because the outputs of the FET bridges 202 are connected in parallel, the output of one bridge 202 may affect the other bridge 202. For example, when bridge 202-A propagating power from conductor set 1 to $V_{DD}$ and $V_{SS}$, the voltages on $V_{DD}$ and $V_{SS}$ are fed back into bridge 202-B and may affect the operation of bridge 202-B. More specifically, the voltages on $V_{DD}$ and $V_{SS}$ may turn on the FETs of the bridge 202-B. The FETs can conduct current bidirectionally, consequently, when activated via the voltages on $V_{DD}$ and $V_{SS}$, the bridge 202-B may pass $V_{DD}$ and $V_{SS}$ voltages to the inputs of the bridge 202-B, and potentially onto conductor set 2 of the Ethernet link 108. Presenting such voltage at a power input of the powered device 102 is a violation of PoE standards and such devices may not be certified for use in PoE systems. Each FET bridge 202 includes control circuitry that prevents an inactive FET bridge 202 from passing voltage from $V_{DD}$ and $V_{SS}$ to the inputs of the inactive bridge 202.

Figure 3:
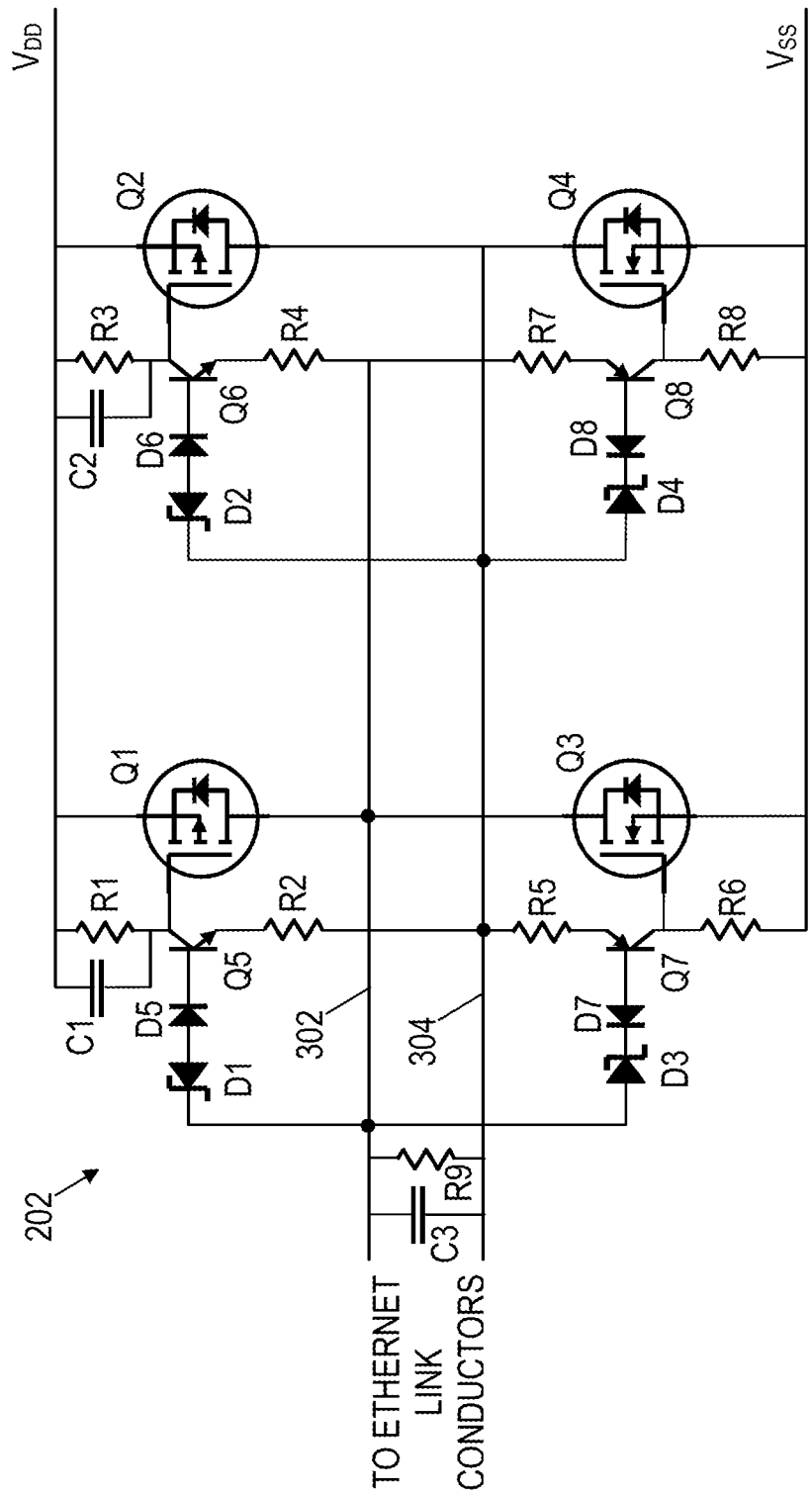
FIG. 3 shows a schematic diagram for an input bridge circuit used in a network device powered via PoE in accordance with principles disclosed herein.

FIG. 3 shows a schematic diagram for an input bridge circuit 202 used in a network device 102 powered via PoE in accordance with principles disclosed herein. The bridge 202 includes two P-channel metal oxide semiconductor FETs (MOSFETs) Q1 and Q2, and two N-channel MOSFETs Q3 and Q4. The MOSFETs Q1, Q2, Q3, Q4 are connected to form a bridge. The source terminals of MOSFETs Q1 and Q2 are connected, and the source terminals of MOSFETs Q3 and Q4 are connected. The drain terminals of MOSFETs Q1 and Q3 are connected to a first set of input terminals of the powered device 102 for receiving power via a given conductor set the Ethernet link 108. The drain terminals of MOSFETs Q2 and Q4 are connected to a second set of input terminals of the powered device 102 for receiving power via the given conductor set of the Ethernet link 108.

MOSFETs Q1 and Q4 connect the input terminals of the powered device 102 to the power supply 204 (i.e., bridge 202 input to bridge 202 output) if line 302 is positive relative to line 304. MOSFETs Q2 and Q3 connect the input terminals of the powered device 102 to the power supply 204 if line 304 is positive relative to line 302.

The FET bridge 202 includes control circuitry that manages the operation of the MOSFETs Q1, Q2, Q3, and Q4. The voltage at the gate terminal of MOSFET Q1 is controlled by resistors R1 and R2, transistor Q5, diodes D1 and D5, and capacitor C1. Resistors R1 and R2 form a voltage divider that reduces the voltage at the gate of MOSFET Q1. MOSFET Q2 is controlled by resistors R3 and R4, transistor Q6, diodes D2 and D6, and capacitor C2. MOSFET Q3 is controlled by resistors R5 and R6, transistor Q7, and diodes D3 and D7. MOSFET Q4 is controlled by resistors R7 and R8, transistor Q8, and diodes D4 and D8.

When the PSE 104 drives a voltage onto the Ethernet link 108, such that the voltage on line 302 of the FET bridge 202 is positive relative to line 304, when the voltage exceeds a diode forward voltage and the MOSFETs Q1 and Q4 are off, current flows through the FET bridge 202 via the drain-source body diodes of the MOSFETs Q1 and Q4. Under such conditions, the FET bridge 202 is equivalent to and operates as a diode bridge. When the voltage across the lines 302, 304 exceeds the reverse voltage of the zener diodes D1 and D4, current flows through the zener diodes D1 and D4 and turns on bipolar transistors Q5 and Q8. In turn, transistors Q5 and Q8 drive the gates of MOSFETs Q1 and Q4 and turn on the MOSFETs Q1 and Q4 providing a low resistance connection of lines 302 and 304 to $V_{DD}$ and $V_{SS}$ respectively. Similarly, when the voltage on line 304 of the FET bridge 202 is positive relative to line 302, MOSFETs Q2 and Q3, and associated circuitry, operate in accordance with the description above to connect line 304 and 302 to $V_{DD}$ and $V_{SS}$ respectively.

Prior to providing operating power via the Ethernet link 108, the PSE 104 executes a detection sequence to determine whether the device 102 is to be powered via the Ethernet link 108. The detection sequence determines a resistance of the device 102, where the resistance (e.g., 19-26 kilo-ohms) signifies whether the device 102 is to be powered via the Ethernet link 108. The resistance of the device 102 is determined by measuring the current flowing through the device 102 at two different detection voltages provided to the device 102 by the PSE 104 via the Ethernet link 108. For example, the PSE 104 may provide a first detection voltage (e.g., 4 volts) into the FET bridge 202 via the Ethernet link 108 and measure the current flow, and thereafter provide a second detection voltage (e.g., 8 volts) into the FET bridge 202 via the Ethernet link 108 and measure the current flow. In some implementations, the first and second detection voltage may be any voltage between 2.8 volts and 10 volts with at least one volt differential between the two detection voltages. The PSE 104 may compute the resistance as:

$$R = \frac{(V_2 - V_1)}{(I_2 - I_1)}$$

The circuitry controlling activation of the MOSFETs Q1-Q4 ensures that the MOSFETs Q1-Q4 remain inactive during the detection sequence. Keeping the MOSFETs Q1-Q4 off during the detection sequence is important because activation of the MOSFETs Q1-Q4 during the detection sequence can change the apparent resistance of the device 102 and erroneously indicate to the PSE 104 that the device 102 is not to be powered via the Ethernet link 108. For example, using the 4 volt and 8 volt detection voltages referred to above, if the 4 volt detection measurement is made with MOSFETs Q1 and Q4 off, and the 8 volt detection measurement is made with the MOSFETs Q1 and Q4 on, the lower circuit resistance of the second measurement may corrupt the overall resistance measurement.

The voltage level (i.e., across lines 302, 304) at which the MOSFETs Q1-Q4 turn on is controlled by the zener diodes D1-D4. In the FET bridge 202, the zener diodes D1-D4 allow the MOSFETS Q1-Q4 to turn on only after the detection sequence is complete. Consequently, the FET bridge 202 operates as a diode bridge and presents a consistent resistance throughout the detection sequence. The bridge resistance is lowered by activating the MOSFETs only after the detection sequence is complete. Thus, after the detection sequence is complete, and the PSE 104 increases the voltage on the lines 302-304 to a voltage that exceeds a predetermined detection voltage range and the zener diodes D1-D4 activate the MOSFETs Q1-Q4. In some implementations, the zener diodes D1-D4 have a reverse voltage greater than 10 volts. In some implementations, the zener diodes D1-D4 have a reverse voltage of 15 volts. Using zener diodes D1-D4 having a reverse voltage of 15 volts, the MOSFETS Q1-Q4 are activated only after the voltage across lines 302-304 exceeds 15 volts (i.e., after the detection sequence is complete). In a FET bridge implementation using a lower zener reverse voltage (e.g., 5 volts), or otherwise activating the FETs during the detection sequence, the resistance measurement may be corrupted as the bridge resistance changes with FET activation.

The MOSFET control circuitry also prevents reverse voltage propagation through the FET bridges 202. As shown in FIG. 2, implementations of the powered device 102 include at least two FET bridges 202-A, 202-B. Which one of the two FET bridges 202 is activated to transfer power from the Ethernet link 108 is determined based on which conductor set of the Ethernet link 108 is selected for detection and power transfer by the PSE 104. Thus, if conductor set 1 is selected for power transfer, then bridge 202-A is activated and bridge 202-B remains inactive. Similarly, if conductor set 2 is selected for power transfer, then bridge 202-B is activated and bridge 202-A remains inactive. If a bridge 202 that should be inactive is activated, the voltage from $V_{DD}$ and $V_{SS}$ will propagate onto the conductors (or input terminals) connected to the bridge 202 in violation of the PoE standards. Such undesired activation may occur if the MOSFETs Q1-Q4 are momentarily activated due to a transient voltage that creates a gate-source voltage differential at the MOSFETs Q1-Q4. The transient briefly turns on the MOSFETs Q1-Q4 and the voltage propagated from $V_{DD}$ and $V_{SS}$ to lines 302-304 latches the MOSFETs Q1-Q4 on through the transistors Q5-Q8 and associated components.

The FET bridge 202 includes capacitors C1, C2 across the gate pull-up resistors R1, R3 of the P-channel MOSFETs Q1, Q2. The capacitors C1, C2 provide filtering that reduces the effects of transients and transitions on the gate-source voltages of the MOSFETs Q1 and Q2. By reducing the gate-source voltage difference due to transients and transitions on $V_{DD}$ and $V_{SS}$, the capacitors C1, C2 prevent the MOSFETs Q1 and Q2 from turning on, and producing reverse voltage, when the bridge 202 is not being used to transfer power from the Ethernet link 108. Thus, the FET bridge 202 avoids the reverse voltage propagation occurring in FET bridges lacking such filtering.

FIG. 4 shows a flow diagram for a method for using a FET bridge in a network device powered via PoE in accordance with principles disclosed herein. Though depicted sequentially as a matter of convenience, at least some of the actions shown can be performed in a different order and/or performed in parallel. Additionally, some implementations may perform only some of the actions shown.

In block 402, the PSE 104 is determining whether the device 102 is to be powered via the Ethernet link 108. The PSE 104 executes a detection sequence that drives at least two different voltages onto the Ethernet link 108. The control circuitry of the FET bridge 202 disables the MOSFETs Q1-Q4 throughout the detection sequence and, throughout the detection sequence, operates the FET bridge as a diode bridge.

In block 404, the detection sequence is complete and the PSE 104 raises the voltage provided to the device 102 to a voltage higher than is specified in the PoE standards for use during the detection sequence. In response to the non-detection voltage, the control circuitry of the FET bridge 202 activates the MOSFETs and reduces the resistance of the FET bridge 202.

In block 406, the control circuitry of the FET bridge (e.g., 202-B) that is not connected to the conductor set of the Ethernet link 108 being used for detection and power provision holds the MOSFETs of the FET bridge 202-B inactive by filtering transients and transitions on the power supply voltages ($V_{DD}$ and $V_{SS}$) driven by the active FET bridge 202-A. Holding the MOSFETs off prevents reverse voltage feedback through the unused FET bridge 202-B.

Thus, the FET bridge 202 provides high efficiency in PoE applications while avoiding problems and PoE standard violations that would occur when conventional FET bridges are applied in PoE applications. The PoE standards fail to consider the difficulties of utilizing a FET bridge in a powered device. The operational issues addressed by the FET bridge 202 are unknown in the prior art and the root causes are exceedingly difficult to identify when encountered because while a conventional FET bridge will itself operate as expected, its operation raises issues in the context of PoE that one skilled in art would not expect to encounter.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
   a network powered device to be powered via conductors of an Ethernet link, the network powered device comprising:
   a plurality of bridge networks, each of the bridge networks to be coupled to power conductors of the Ethernet link and comprising:
   a plurality of field effect transistors (FETs) connected as a bridge circuit; and
   a plurality of bipolar transistors, wherein, for each FET of the plurality of FETs, a gate of the FET is coupled to a collector terminal of a unique one of the plurality of bipolar transistors, wherein the plurality of FETs are to pass current in response to a completion of a powered device detection sequence performed by power sourcing equipment coupled to the device via the Ethernet link, and wherein, for each FET of the plurality of FETs, the gate is also coupled to a capacitor in parallel with a pull-up resistor.

2. The system of claim 1, wherein each of the bridge networks further comprises a plurality of zener diodes, each of the zener diodes coupled to a base terminal of one the plurality of bipolar transistors; wherein each of the zener diodes comprises a reverse breakdown voltage that is greater than the highest voltage provided by the power sourcing equipment via the Ethernet link as part of the detection sequence.

3. The system of claim 2, wherein each of the plurality of zener diodes has a reverse breakdown voltage of at least eleven volts.

4. The system of claim 1, wherein the bridge network is to operate as a diode bridge until after completion of the detection sequence.

5. The system of claim 2, further comprising, for each bipolar transistor, a diode connecting the base terminal of the bipolar transistor to one of the zener diodes.

6. A network device, comprising:
first terminals for receiving power via an Ethernet link;
a first bridge circuit coupled to the first terminals and comprising:
 a pair of N-channel field effect transistors (FETs) coupled source to source;
 a pair of P-channel FETs coupled source to source;
 a plurality of bipolar transistors; and
 a plurality of zener diodes,
 wherein, for each FET, a gate is coupled to a collector terminal of a bipolar transistor, and the gate is also coupled to a capacitor in parallel with a pull-up resistor,
 wherein each of the zener diodes is coupled to a base terminal of one of the bipolar transistors, and
 wherein each of the zener diodes has a reverse breakdown voltage greater than the maximum voltage applied by power sourcing equipment to determine whether the network device is to receive power via the Ethernet link.

7. The network device of claim 6, wherein the zener diodes have reverse breakdown voltage of at least eleven volts.

8. The network device of claim 6, wherein the zener diodes have reverse breakdown voltage between fourteen and sixteen volts.

9. The network device of claim 6, wherein, for each bipolar transistor, an emitter terminal is coupled to one of the first terminals.

10. The network device of claim 6, further comprising, for each bipolar transistor, a diode connecting the base terminal to one of the zener diodes.

11. A power over Ethernet device, comprising:
a plurality of bridge circuits, each of the bridge circuits comprising:
 inputs to be coupled to a set of conductors of an Ethernet link;
 a plurality of field effect transistors (FETs); and
 a plurality of bipolar transistors,
 wherein, for each FET, a gate of the FET is coupled to:
  a collector terminal of one of the plurality of bipolar transistors; and
  a capacitor in parallel with a pull-up resistor,
 wherein the plurality of FETs are to pass current between the inputs and outputs of the bridge circuit in response to a completion of a powered device detection sequence performed by power sourcing equipment coupled to the device via the Ethernet link.

12. The power over Ethernet device of claim 11, wherein each of the bridge circuits further comprises a plurality of zener diodes, each of the zener diodes coupled to a base terminal of one the plurality of bipolar transistors, each of the zener diodes having a reverse breakdown voltage greater than the predetermined maximum detection voltage.

13. The power over Ethernet device of claim 12, wherein each of the plurality of zener diodes has a reverse breakdown voltage of at least eleven volts.

14. The power over Ethernet device of claim 11, wherein each of the bridge circuits is to prevent current flow through the FETs between the inputs and outputs of one of the bridges that is not providing power to the device based on the other of the bridges providing power to the device.

15. The power over Ethernet device of claim 12, further comprising, for each bipolar transistor, a diode connecting the base terminal of the bipolar transistor to one of the zener diodes.

16. The power over Ethernet device of claim 11, wherein, in each bridge circuit, the plurality of FETs are disabled from passing current between the inputs and outputs of the bridge circuit during the powered device detection sequence.

17. The system of claim 1, wherein, in each bridge network, the plurality of FETs are disabled from passing any current during the powered device detection sequence.

18. The network device of claim 6, wherein the first bridge circuit prevents current flow through the FETs during a powered device detection sequence performed by the power sourcing equipment.

\* \* \* \* \*